United States Patent [19]

Schmertz

[11] Patent Number: 4,753,772
[45] Date of Patent: Jun. 28, 1988

[54] MULTI-STRAP SHOCK ABSORBER

[75] Inventor: John C. Schmertz, Pittsburgh, Pa.

[73] Assignee: Westinghouse Electric Corp., Pittsburgh, Pa.

[21] Appl. No.: 832,492

[22] Filed: Feb. 21, 1986

[51] Int. Cl.[4] ............................................. G21C 9/00
[52] U.S. Cl. .................................. 376/285; 188/268; 188/371; 188/376
[58] Field of Search ................... 52/167; 188/268, 371, 188/376; 248/603, 604, 630; 267/141, 148; 376/285

[56] References Cited

U.S. PATENT DOCUMENTS

| 2,063,638 | 12/1936 | Trott et al. ........................... 248/630 |
| 3,261,579 | 7/1966 | Engman et al. . |
| 3,361,475 | 1/1968 | Villiers ................................. 188/268 |
| 3,937,407 | 2/1976 | Matsuo ................................. 188/376 |
| 4,004,768 | 1/1977 | Evans et al. . |
| 4,269,400 | 5/1981 | Jensen .................................. 267/141 |
| 4,465,252 | 8/1984 | Donovan, Jr. et al. . |

FOREIGN PATENT DOCUMENTS

| 12093 | 1/1979 | Japan ................................... 376/285 |
| 1087217 | 10/1967 | United Kingdom ................. 376/285 |
| 672304 | 7/1979 | U.S.S.R. .............................. 52/167 |

OTHER PUBLICATIONS

"Piping Seismic Test with Energy-Absorbing Devices," NP-2902, Mar. 1983.
"The Bechtel Energy Absorber".

Primary Examiner—Deborah L. Kyle
Assistant Examiner—Richard W. Wendtland
Attorney, Agent, or Firm—D. C. Abeles

[57] ABSTRACT

A tension loaded energy dissipating support member includes multiple successively longer metal straps all connected at each end to an end connector with the longer straps, and preferably the shortest strap, bowing outward laterally such that as the tensile load increases, the straps, beginning with the shortest, successively plastically deform to dissipate shock energy. The initial bowing, type of material, and relative dimensions of the straps can be varied to obtain the desired load supporting and energy dissipating characteristics.

15 Claims, 4 Drawing Sheets

MULTI-STRAP SHOCK ABSORBER

BACKGROUND OF THE INVENTION

1. Field of the Invention

This invention relates energy dissipating devices such as tension loaded supports which protect the components supported by them from mechanical shock by absorbing and dissipating the shock energy, and has particular application in supports subject to severe seismic loading.

2. Prior Art

Existing supports with the capacity to absorb and dissipate significant amounts of seismic shock energy are typically compression devices. Hydraulic snubbers are an example of such devices currently in use. The conventional supports which act in tension, such as tie-rods or pipe hangers are simple, convenient and space saving. Unfortunately, they offer little capacity for absorbing and dissipating energy, since they operate in the elastic range where most of the energy is stored momentarily in elastic strain and is returned to the system. Such devices are normally of such a construction that once the point of plastic deformation is reached, they may fail completely.

It is a primary object of the present invention to provide a device which combines all the advantages and conveniences of conventional tensile supports with the ability to absorb and dissipate a significant amount of shock energy.

It is another object of the invention to provide such a device which operates in the elastic range during normal operation but plastically deforms to dissipate a large amount of energy when subjected to severe seismic loads.

It is still another object of the invention to provide the device of the previous objects having portions which remain elastic to maintain structural support while other portions plastically deform to dissipate significant amounts of energy.

It is yet another object of the invention to provide the device of the previous objects which is simple in design and inexpensive to manufacture so that it can be economically replaced after portions have plastically deformed during a severe seismic event. It is an overall object of the invention to provide a device which has a plurality of elements which successively plastically deform to dissipate energy.

SUMMARY OF THE INVENTION

These and other objects are realized by a device which includes a plurality of successively longer metal straps all connected at their ends to a pair of end members such that at least all the straps but the shortest one, and in the preferred embodiment the shortest one also, are bowed when no tensile load is applied to the end members. The lengths of the straps are selected such that beginning with the shortest, the successively longer straps sequentially reach their yield points and plastically deform to dissipate energy as the tensile load on the end members increases.

With this arrangement the longer straps remain in the elastic region to provide support for the component to which the device is connected while the shorter straps one after the other plastically deform to dissipate significant amounts of energy. As used for supporting components which may on occasion be subjected to seismic shocks, the straps are selected so that they all remain in the elastic region during normal loading and so that at least the longest strap remains elastic to maintain support during a seismic event. Of course, once any of the straps have plastically deformed, they must be replaced, however, they are relatively inexpensive and would be suitable for use in areas where significant seismic events were infrequent.

The design of the device is very flexible. Through judicious selection of each individual strap, a wide range of load, and energy absorbing and dissipating characteristics can be attained. The variables include the amount of initial bow in the straps, their relative lengths, the materials used and the thickness and width of the individual straps. For instance, where it is desired that each successive strap begin to plastically deform at successively higher tensile loads, the straps may be made of different materials providing the desired characteristics and/or they can be made from stock having successively greater cross-sectional area. Preferably, the increase in cross-sectional area is attained by selecting straps having successively greater width but the same thickness.

In one specific embodiment described in detail, the device includes three metal straps all of the same thickness but with the longer straps successively wider than the shorter straps so that they can sustain successively higher tensile loads before plastically deforming. In another embodiment described, the second of three straps is narrower than the first while the third is the widest so that after the first strap ruptures, the second immediately plastically deforms also thereby dissipating a large amount of energy before it fails and the load is transferred to the third strap, which remains elastic.

Although the invention has many uses, one application where it is particularly useful is in supporting the piping in a nuclear power plant which must be seismically qualified.

In its broadest sense, the invention is directed to a plurality of elongated energy dissipating elements which are joined at each end by end members in an arrangement such that a load applied through the end members results in the elongated elements successively reaching their yield point and plastically deforming to dissipate energy.

BRIEF DESCRIPTION OF THE DRAWINGS

A full understanding of the invention can be gained from the following description when read in conjunction with the accompanying drawings in which.

DESCRIPTION OF THE PREFERRED EMBODIMENT

Figure 1:
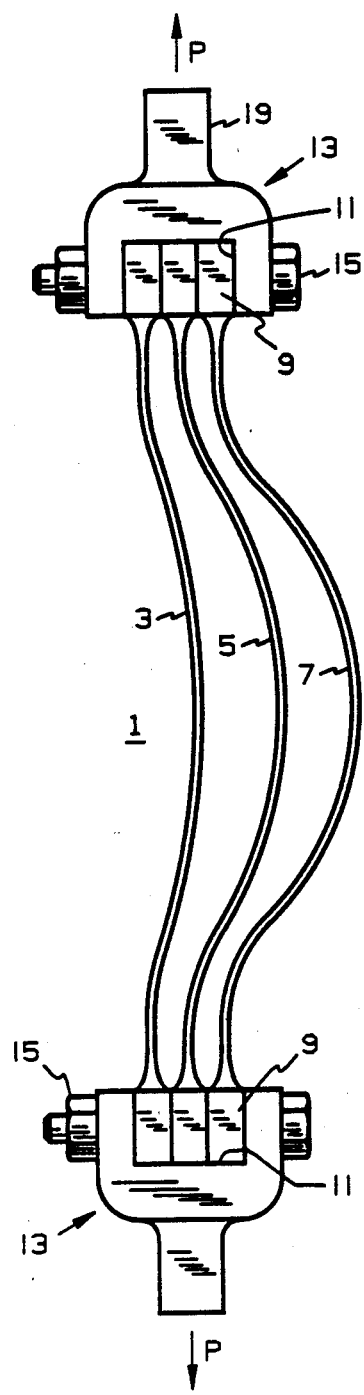
FIG. 1 is a side view of a multistrap energy dissipating tension-loaded support member according to the invention shown in the unloaded state.
Figure 2:
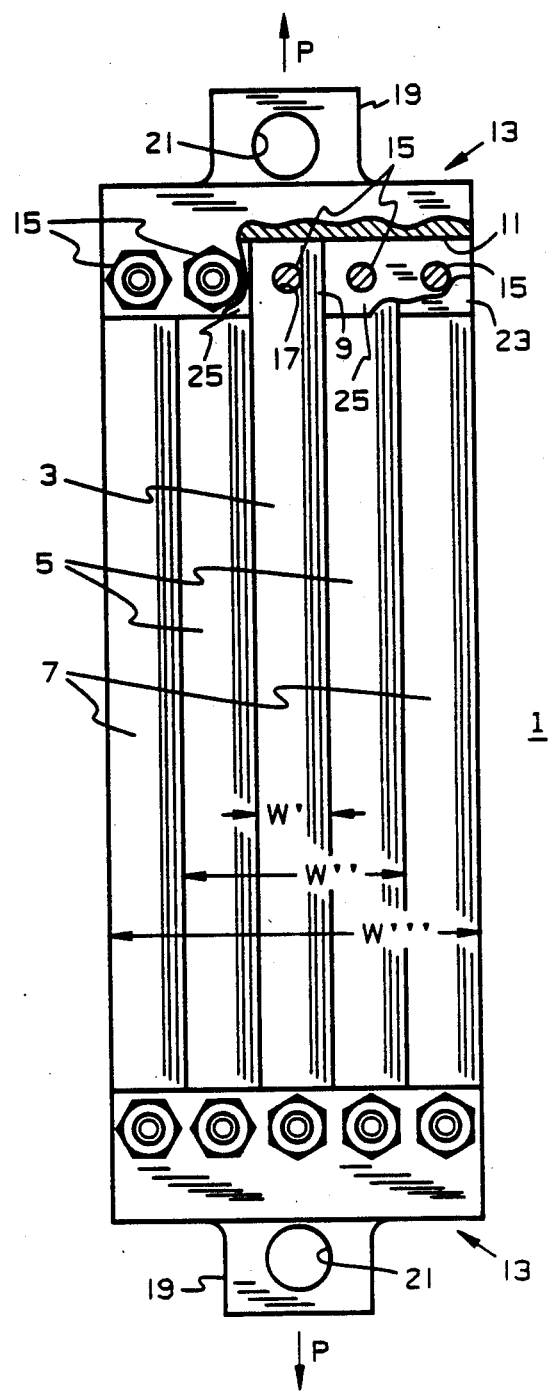
FIG. 2 is a front view of the support member of FIG. 1 as seen from the left in FIG. 1 with some parts broken away.

As shown in FIGS. 1 and 2, the support member 1 according to the invention includes a plurality of, in this case three, successively longer metal straps 3, 5 and 7. Opposite ends 9 of all of these straps are secured in grooves 11 in a pair of end members 13 by a series of nuts and bolts 15. The integral ends 9 are thickened to accommodate holes 17 through which the bolts pass. The end members 13 each include an integral boss 19 with an eye 21 by which the end members 13 can be engaged to apply tensile loads to the support member 1.

As seen in FIG. 2 the width w''' of the longest strap 7 is wider than the width w'' of the second longest strap 5 which in turn is wider than the width w' of the shortest strap. In order to fill the gaps created by the narrower straps, inserts 23 and 25 are provided so that the ends of the straps 5 and 7 can be clamped tightly as is the end of strap 3. With this arrangement, most of the tensile load is transmitted to the straps through friction forces.

Figure 3:
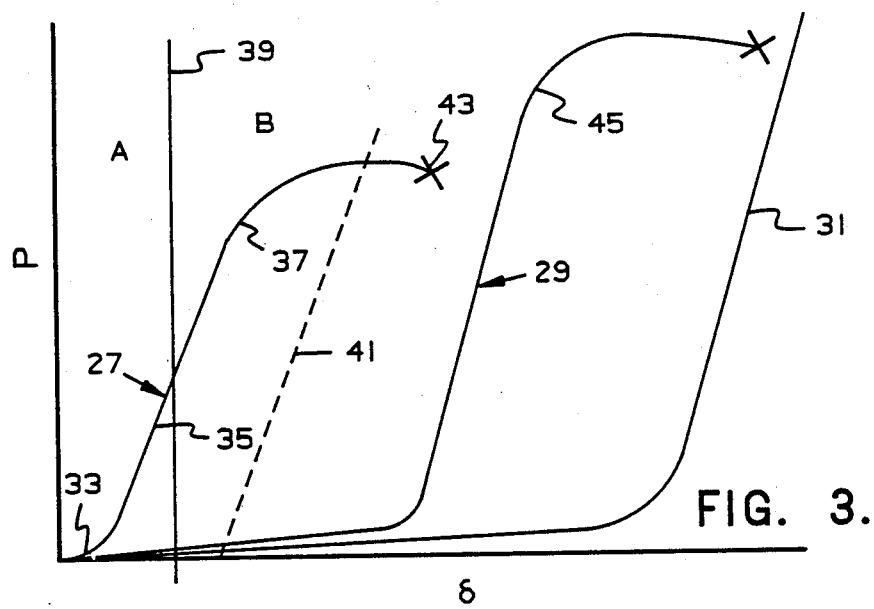
FIG. 3 is a load versus deflection diagram for the support member of FIGS. 1 and 2.

In this embodiment of the invention, even the shortest metal strap 3 is bowed in the unloaded state shown in FIGS. 1 and 2. A typical load-deflection (P vs. $\delta$) diagram for such a device is shown in FIG. 3 in which curves 27, 29 and 31 represent the characteristics of the straps 3, 5 and 7 respectively. As a tensile load P is applied to the end member 13, the strap 3 straightens out. This requires relatively little tension as indicated by the small slope to the initial portion 33 of curve 27. As the tensile load is increased, the slope of curve 27 increases and becomes constant at 35 as the strap 3 stretches but remains elastic. The straps 5 and 7 are still bowed at this point and hence they assume very little of the load. Thus, all three straps remain elastic.

As the tensile load increases further, the strap 3 reaches the yield point and plastic deformation begins as indicated by the rapid decrease in the slope of curve 27 at about 37. The normal operating domain for the support member 1 is the area A to the left of the vertical line 39 which provides a comfortable margin below the yield point of strap 3. In this region, where all the straps remain elastic, the curve 27 is retraced to the origin as the tensile load is removed. Since the area under the curves on this load versus deflection plot remains energy input to the device, it can be appreciated that in this elastic domain, the energy is stored in elastic strain and is recovered when the tensile load is removed.

However, after the strap 3 begins to yield, the curve 27 is not retraced when the load is relieved. Instead, a path such as that represented by the dotted line 41 is followed down to zero load. In this instance, the energy under the curve 27 to the left of the dotted line 41 is dissipated as heat, and only the area under the curve 27 to the right of line 41 is returned to the system. Thus a significant amount of energy is dissipated under circumstances such as would accompany a severe seismic event where the shock loads reach a magnitude which causes plastic deformation of strap 3.

If the tensile load is great enough, the strap 3 will rupture at point 43 and all the load will be transferred to straps 5 and 7. In the particular instance illustrated in FIG. 3, where the strap 5 is just about straightened out when strap 3 ruptures, it rapidly stretches as shown by curve 29 to the extent dictated by the load, and then, with increased load, it too reaches its yield point at about the point 45 and plastically deforms thereby dissipating more energy as heat. When strap 5 ruptures, the load is transferred to the strap 7 represented by curve 31 in FIG. 3. Strap 7 is designed so that it will remain elastic for any anticipated shock load to maintain support for the component being held by the support member. While the discussion has proceeded as though the force progressively increases, in the case of a seismic shock peak force is experienced virtually instantaneously with straps 3 and 5 rapidly plastically deforming if the peak load is sustained long enough.

Figure 4:
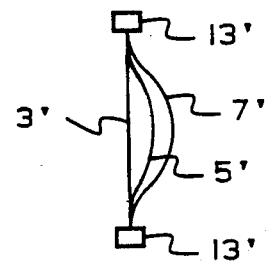
FIG. 4 is a side elevation view of another embodiment of the invention.

Another embodiment of the invention is shown schematically in FIG. 4. This support member 1' also includes three successively longer metal straps 3', 5' and 7' secured at their ends to a pair of end members 13'. However, in this arrangement, the shortest strap 3' is fully extended and not bowed in the unloaded condition. Thus, as shown in the load-deflection plot for this device illustrated in FIG. 5, the curve 47 representing the characteristics of strap 3' slopes steeply upward from the origin as the elastic domain is entered immediately.

Figure 5:
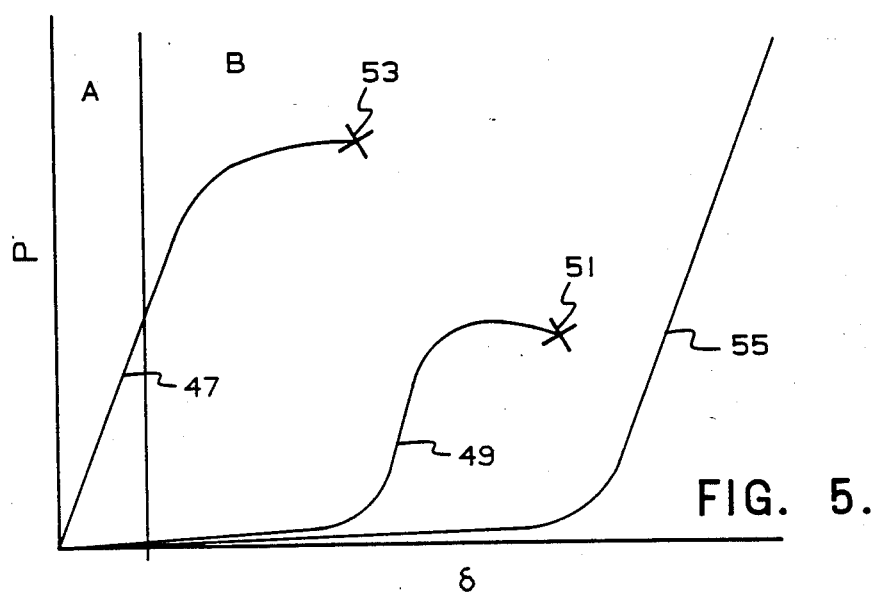
FIG. 5 is a load versus deflection diagram for the support member of FIG. 4.

As can be appreciated from the load-deflection plot of FIG. 5, the intermediate strap 5' represented by the curve 49 has a lower yield point than the strap 3'. This can be achieved by using a different material for the two straps and/or by making the cross-section of the strap 5' less than that of the strap 3'. Despite the lower yield point, the strap 5' will not plastically deform before the strap 3' because it is bowed and does not straighten out until the strap 3' has plastically deformed a sufficient amount to take up the slack. With strap 5' having a lower yieldpoint and rupture point 51 than strap 3', when strap 3' ruptures at point 53, strap 5' will rapidly rupture, dissipating a substantial amount of energy in the process, and shifting the entire load to strap 7' represented by curve 55 which has been designed to remain elastic with the peak load anticipated.

From the discussion of these two specific embodiments of the invention, it can be appreciated that a designer has a great deal of flexibility in tailoring the characteristics of the support member for the particular circumstances of a given application.

A specific example of the invention is a support member with three straps each made of ¼ inch thick stainless steel with a yield strength of 20,000 psi and a Young's modulus equal to $28 \times 10^6$ psi. The shortest strap is 1 inch wide, the middle strap 1.1 inches wide and the third strap 5 inches wide. With all of the straps bent into a sinusoidal shape and the ends 36 inches apart, the unbent lengths are 36.360, 38.292 and 38.710 inches, respectively. The loads required to straighten them out are 239.15, 249.53 and 1,122.33 pounds, respectively and the associated displacements are 0.36, 2.292 and 2.710 inches. The corresponding displacement between the point where a strap straightens out and the yield point is reached is 0.027, 0.02736 and 0.02765 inches for a maximum elastic displacement of 0.3857, 2.320 and 2.738 inches at a maximum load of 5,000, 5,500 and 25,000 pounds respectively.

Figure 6:
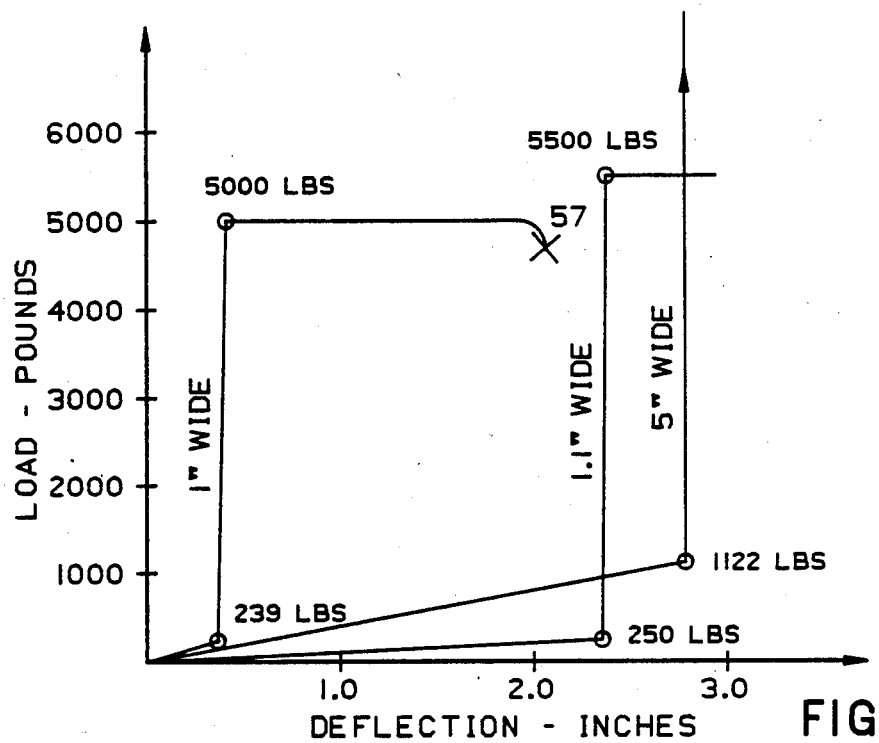
FIG. 6 is a load versus deflection diagram of each of the three straps in an exemplary support member according to the invention.
Figure 7:
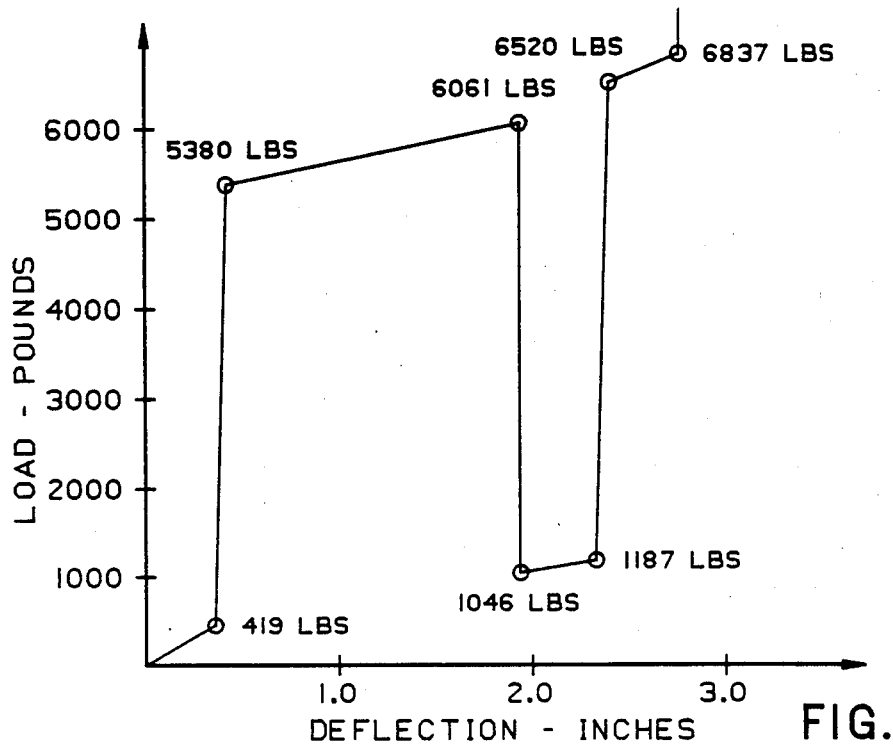
FIG. 7 is a composite of the three load versus deflection diagrams of FIG. 6.

FIG. 6 is a load (P) versus deflection ($\delta$) diagram for the individual straps of the exemplary support member. As can be seen, the 1 inch strap straightens out with a load of 239 pounds, yields at 5,000 pounds and after 5% elongation ruptures at point 57. The 1.1 inch strap straightens out at about 250 pounds and yields at 5,500 pounds while the 5 inch strap straightens out at 1,122 pounds and remains elastic for the loads indicated. As represented by the areas under the curves to the right of the near vertical elastic portions, the shortest strap dissipates about 658 foot pounds of energy, and the middle strap dissipates about 180 foot pounds for a total of over 800 foot pounds.

Figure 8:
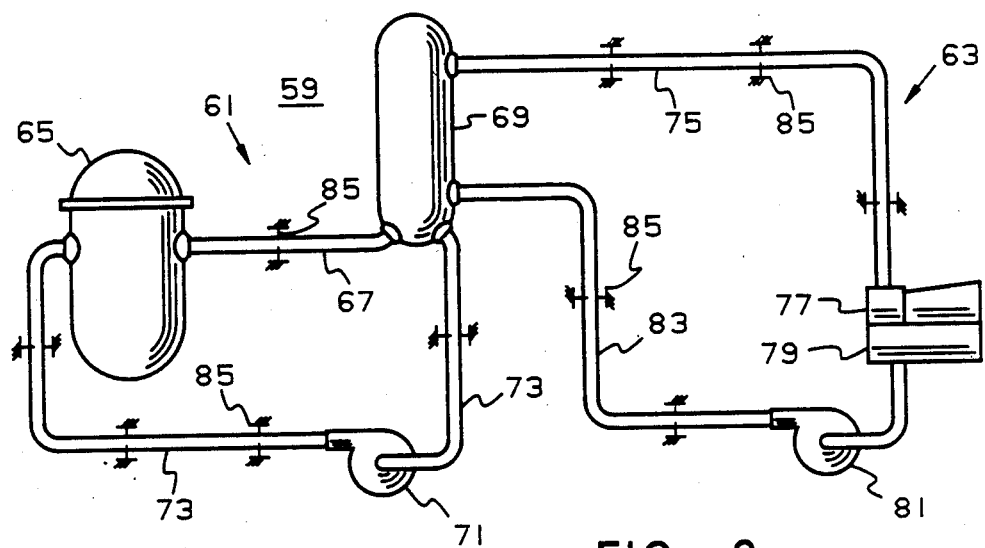
FIG. 8 is a schematic diagram illustrating application of the invention to a nuclear steam supply system.

One particular application of the invention is providing support for the piping in a nuclear power plant. All parts of the plant, including the piping, must be capable of withstanding seismic shocks. FIG. 8 illustrates in simplified form, a nuclear steam supply system 59 for a pressurized water reactor (PWR) nuclear power plant to demonstrate this application of the invention.

The nuclear steam supply system 59 comprises a primary loop 61 and a secondary loop 63. The primary loop 61 includes a nuclear reactor 65 in which controlled fission reactions generate heat which is absorbed by a reactor coolant. The reactor coolant, which is light water, is circulated through hot leg piping 67 to a steam generator 69 where the heat is utilized to generate steam. The reactor coolant is returned to the reactor 65 by a reactor coolant pump 71 through cold leg piping 73. The steam generated in the steam generator 69 is circulated through a steam header 75 to a turbine-generator 77 which generates electricity. Steam exhausted by the turbine-generator 77 is condensed in condenser 79 and returned to the steam generator 69 by a condensate pump 81 through return piping 83.

Figure 9:
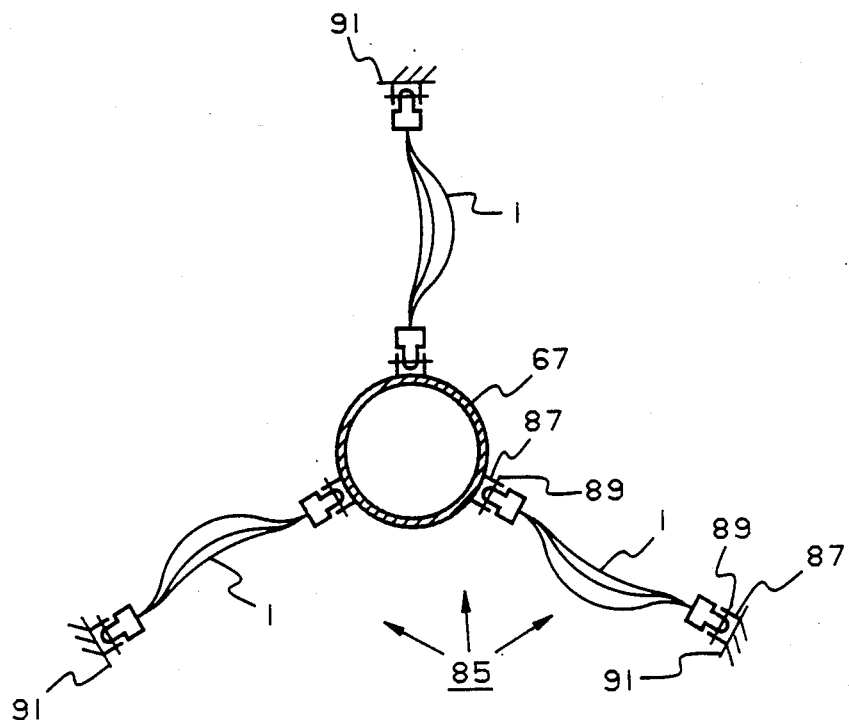
FIG. 9 is a cross section through one of the pipes of the nuclear steam supply system of FIG. 8 illustrating the manner in which the invention is employed.

The piping in the nuclear steam supply system 59 is supported by supports 85 which include, as best seen in FIG. 9, three tension loaded support members 1 angularly spaced 120° apart around, and extending radially outwardly from, each pipe. Each support member 1 is secured to the pipe by a clevis 87 and pin 89 which passes through the aperture 21 in one end member 13. The other end member 13 is secured to a fixed support 91 by a similar clevis 87 and pin 89 arrangement. Three support members 1 are equiangularly spaced around the piping since the seismic loads can come from any direction. Thus, the supports are used on vertical sections of the piping as well as horizontal sections. In the latter case, they also support the dead load. The piping arrangement of FIG. 8 is not meant to be representative of the actual piping layout in a plant, but is intended to show the use of the invention in supporting both horizontal and vertical sections of piping. The invention is not only useful in supporting the main piping in the nuclear steam supply system, but can also be used to support the piping of auxiliary systems, and in fact, any of the piping in the plant.

While the specific embodiments of the invention have been described in detail, it will be appreciated by those skilled in the art that various modifications and alternatives to those details could be developed in light of the overall teachings of the disclosure.

For instance, while the invention has been described as applied to tension loaded supports, the broad principles can be applied to devices for dissipating energy, particularly seismic energy, other than tension loaded supports and even to devices that only perform an energy absorbing function and not support Accordingly, the particular arrangements disclosed are meant to be illustrative only and not limiting as to the scope of the invention which is to be given the full breadth of the appended claims and any and all equivalents thereof.

What is claimed is:

1. An energy dissipating tension loaded support member comprising:
   a pair of spaced apart end members to which a tension load is applied; and
   a plurality of straps of successively longer lengths of stiff metallic material each connected at each end to an end member such that at least all of said straps but the shortest one are bowed with no load applied to the end members, the lengths of said straps being selected such that beginning with the shortest strap, the successively longer straps sequentially reach their yield points and plastically deform to dissipate energy as the tension load on said end members increases.

2. The support member of claim 1 wherein said shortest strap is also bowed when no load is applied to the end members.

3. The support member of claim 1 wherein said straps are selected such that the successively longer straps require successively higher loads to plastically deform.

4. The support member of claim 1 wherein at least said shortest strap yields to the point of rupture under expected tension loads.

5. The support member of claim 4 wherein at least the longest strap remains elastic with the expected tension loads.

6. The support member of claim 3 wherein said straps are all made of the same metallic material with successively longer straps having successively greater cross-sectional areas.

7. The support member of claim 6 wherein said straps are all of the same thickness with successively longer straps being successively wider.

8. The support member of claim 7 comprising three successively longer and wider straps.

9. The support member of claim 8 wherein the shortest strap is also bowed when no load is applied to the end members.

10. A multi-strap shock absorber comprising:
    a pair of spaced apart end members to which a tension load is applied;
    three metal straps, the second metal strap being longer than the first and the third being longer than the second; and
    means connecting one end of each of the three metal straps to one end member and connecting the other ends of said straps to the other end member, such that at least said second and third straps are bowed when no tension load is applied to the end members.

11. The shock absorber of claim 10 wherein said three straps are made of the same metal and are of the same thickness, said second strap being wider than the first strap and the third strap being wider than the second.

12. The shock absorber of claim 11 wherein said first strap is also bowed when no tension load is applied to said end members.

13. A nuclear steam supply system comprising:
    a nuclear reactor, a steam generator, piping connecting the nuclear reactor with the steam generator for circulation of reactor coolant therebetween, and seismically qualified supports for said piping at selected points along the length thereof each comprising a plurality of energy dissipating tension loaded support members angularly distributed about and extending radially outward from said piping, said tension loaded support members each comprising a pair of spaced apart end members, one connected to said piping and the other to a fixed support, and a plurality of straps of successively longer lengths of stiff metallic material each connected at each end to an end member such that at least all of said straps but the shortest one are bowed with no load applied to the end members, the lengths of said straps being selected such that beginning with the shortest strap, the successively longer straps sequentially reach their yield points and plastically deform to dissipate energy as the tension load on said end members increases.

14. The nuclear steam supply system of claim 13 wherein said seismically qualified supports for said piping comprise three tension loaded support members angularly distributed 120° apart around said piping and extending radially outwardly therefrom.

15. The nuclear steam supply system of claim 14 wherein at least said longest strap of each tension loaded support member remains elastic even with the largest seismic load expected.

* * * * *